June 14, 1960

J. I. MORGAN 2,940,470

CHECK-BLEED VALVE

Filed Sept. 25, 1957

INVENTOR.
JAMES I. MORGAN
BY John W. Michael
ATTORNEY

June 14, 1960  J. I. MORGAN  2,940,470
CHECK-BLEED VALVE

Filed Sept. 25, 1957  2 Sheets-Sheet 2

INVENTOR.
JAMES I. MORGAN
BY John W. Michael
ATTORNEY

United States Patent Office 2,940,470
Patented June 14, 1960

2,940,470
CHECK-BLEED VALVE

James I. Morgan, Milwaukee, Wis., assignor to The Prime Manufacturing Company, Milwaukee, Wis., a corporation of Wisconsin Filed Sept. 25, 1957, Ser. No. 686,179

11 Claims. (Cl. 137—496)

This invention relates to check valves of the type which open only under pressure from one direction but when once opened will remain open to permit flow in the opposite direction until the opening pressure drops to a determined minimum.

One object of this invention is to provide a valve of this type having full pilot action to hold the valve open during sufficient time to allow approximately the same volume of air as entered from the pressure side to bleed out by reverse flow without allowing other operating air to flow in such reverse direction.

Another object is to provide a valve of this kind having improved flow capacity and reliability and which will not stick open and may be manufactured at lower cost.

These objects are accomplished by making the valve body symmetrical to the axis of flow, placing a contoured flow passage concentrically within the pilot piston, supporting the pilot piston at two spaced bearings, employing an internal lip to direct reverse flow to aid fuller pilot action, and using a stronger return spring.

For a detailed description of an embodiment of this invention reference is made to the following specification when read in connection with the accompanying drawings, in which.

Figure 5:
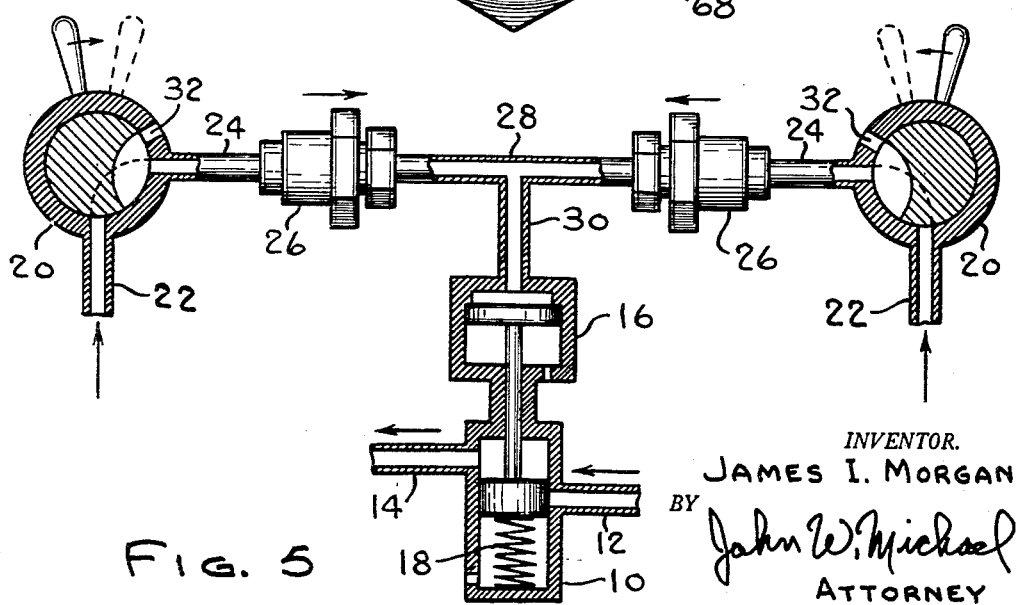
Fig. 5 is a schematic view showing one application of the check valves embodying the present invention.

Referring now to the drawings, Fig. 5 shows a simplified schematic view of that part of the sanding mechanism of a locomotive which illustrates in a general manner one application of the valves embodying the present invention. A control valve 10 directs sanding air from supply line 12 through a delivery line 14 to a sand trap (not shown) to deliver sand to the wheels of the locomotive. Valve 10 is actuated by a fluid motor 16 against the bias of a return spring 18. The operation of fluid motor 16 is controlled from front or rear units of a locomotive by manually operated valves 20 connected to a source of air pressure by lines 22. Valves 20 are separably operable to deliver actuating air to the motor 16 through line 24, check-bleed valves 26, and line 28, 30. The inlet sides of check-bleed valves 26 are vented to atmosphere through outlets 32 when valves 20 are in the closed or off position, as shown in Fig. 5. With this system the check-bleed valves 26 function to let air under pressure flow from one valve 20 to the motor 16 while blocking such air under pressure flowing out to the other valve 20. When the valve 20 is closed the air admitted into the line 28, 30 and motor 16 reverses its flow and bleeds back through the opened check-bleed valve 26. Thus, the check-bleed valves must remain open a sufficient time to let such air escape.

A check-bleed valve embodying the subject matter of the present invention is shown in Figs. 1 to 4, inclusive. It includes a body 36 forming a cylinder with a threaded inlet port 38 at one end and a threaded opening 39 at the other end, both axially aligned with the cylinder axis. A cylindrical sleeve 44 is mounted in the body by means of a flange 46 positioned in the opening 39 and held therein by a cap 40 having a threaded outlet port 42. Port 42 is also axially aligned with the cylinder axis. A pilot piston 47 is slidably mounted within the cylinder and has a stem 48 slidable in an internally flanged portion 50 of sleeve 44. The piston and stem are sealed by O-rings 52 and 54, as shown, to provide two spaced bearings for the pilot piston preventing canting and consequent sticking. A valve member 58 of composite material is mounted on an extended end of the stem 48 and cooperates with a conical seat 64 on the sleeve to shut off flow between the ports. A seat washer 60 shouldered against a face 61 on the extended end is held against the valve member by a lock nut 62. Tightening of such nut can thereby not change the positioning of the valve member and effect a shortening of the operating stroke of the pilot piston.

The pilot piston 47 has an internal passageway 65 coaxially aligned with the axis of the cylinder and ports and terminating in a plurality of transverse openings 66 in the wall of said stem leading to the interior of sleeve 44 between seat 64 and flange 50. The piston head end of the passageway 65 flares outwardly into a trumpet shaped contour 68, which minimizes the velocity effect of reverse flowing air as hereinafter explained in detail. A conical lip 74 at the inner end of inlet port 38 extends inwardly in general conformity with the trumpet shaped contour 68. It terminates in an opening 76 having a diameter slightly less than that of passageway 65 and concentric therewith. It assists in minimizing the velocity effect of reverse flowing air, as hereinafter explained.

A coiled compression spring 70 is mounted on the outside of sleeve 44 and reacts between the flange 46 and the pilot piston to urge the latter to the closed position. Because of the increased holding action obtained, this spring has been made stronger than customary and this insures against sticking of the valve in open position. The interior of the cylinder between the flange 46 and pilot piston 47 is vented to the atmosphere by an opening 72.

Figure 1:
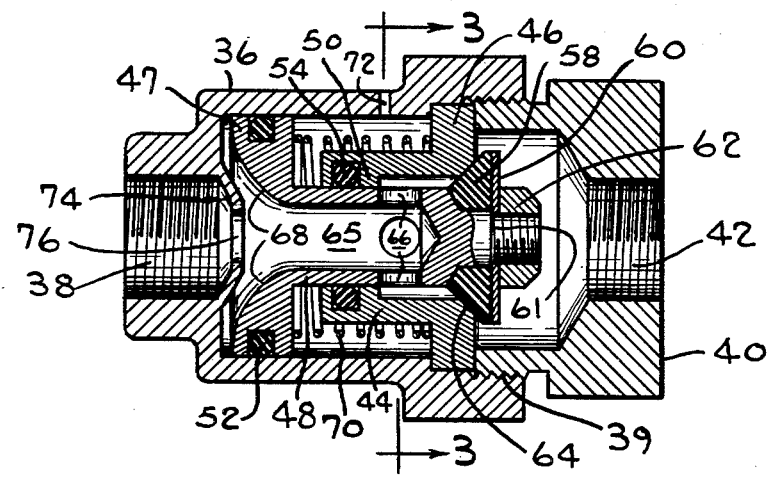
Fig. 1 is a vertical sectional view of a valve embodying the present invention.
Figure 2:
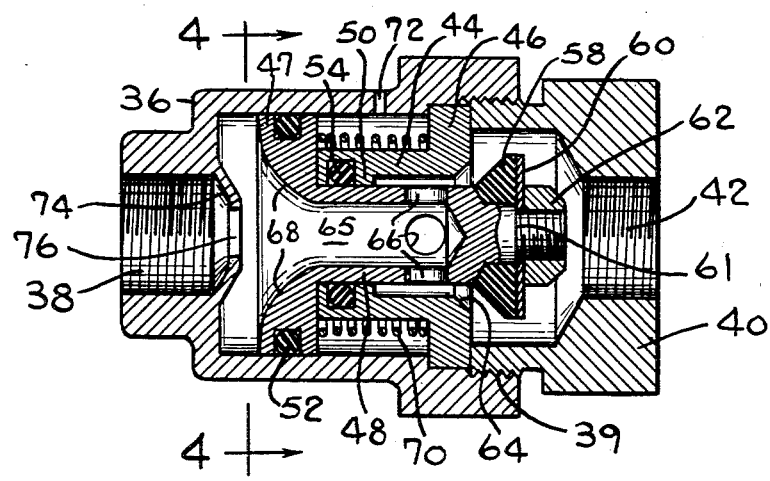
Fig. 2 is a view similar to Fig. 1 but with the valve in the open position.
Figure 3:
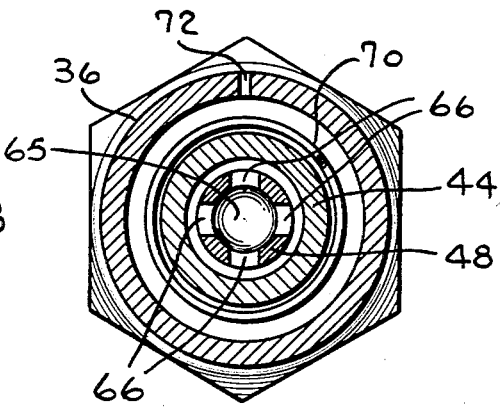
Fig. 3 is a sectional view taken along line 3—3 of Fig. 1.
Figure 4:
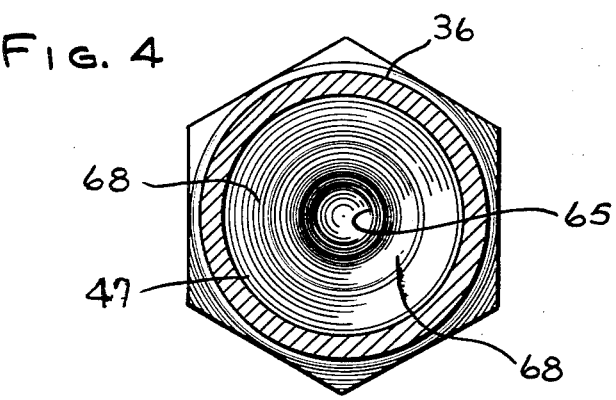
Fig. 4 is a sectional view taken along line 4—4 of Fig. 2.

When air under pressure enters inlet port 38 with the valve closed the differential pressure created by the large head of the pilot piston 47, as compared with the smaller head of the valve member 58 on seat 64, will cause the valve to open to the position of Fig. 2. Air will then flow from inlet port 38 through opening 76, passageway 65, openings 66, valve seat 64, and valve member 58 to outlet port 42. When the air under pressure to opening 38 is stopped and vented such as by closing a control valve 20, the pressure of the air in the line on the outlet port 42 aided by any compressed spring in a control valve, such as spring 18, causes a reverse flow of the air previously admitted through the check-bleed valve. Since the pilot piston is open it continues to respond to the now decreasing pressure in the valve to hold pilot piston 47 against the bias of spring 70 for a long enough period of time to allow substantially all the air admitted during operation to flow back through the valve. This period of time is increased and the pressure at which closing takes place minimized by the action of the trumpet shaped contour 68 and the conical lip 74. The reverse flow of air by velocity action usually acts to scavenge out the air in the compression chamber causing a quick drop in the pilot holding pressure. With this design the velocity action tends to charge air into the space between the contour 68 and the lip 74, thus maintaining the pilot pressure for a longer period and preventing too rapid a drop. In fact the valve has been kept open until gauge pressures as low as 3 pounds per square inch have been reached. This provides full pilot pressure and positive action at low pressures and makes it possible to use a stronger spring to thereby reduce the possibility of sticking in the open position.

The valve so designed may be manufactured by machining process without requiring special castings with complicated cores with resulting reduced costs.

I claim:

1. A check-bleed valve comprising, a body having inlet and outlet ports and a cylinder all axially aligned, a pilot piston slidably mounted in said cylinder, a stem on said piston, guide means in said body slidably guiding said stem and having a valve seat, a valve member mounted on said stem engageable with said seat to shut off flow between said ports, said pilot piston and stem having a passageway therethrough axially aligned with said ports and terminating in a transverse opening on the outlet port side of said guide means and the inlet port side of said valve member, and spring means in said body to bias said pilot piston to close said valve.

2. A check-bleed valve according to claim 1 in which said passageway has a flared out trumpet-contoured-like opening at the inlet port side thereof.

3. A check-bleed valve according to claim 2 in which there is a conical lip at the inner end of said inlet port flaring inwardly in substantial alignment with said trumpet-contoured-like opening to an opening.

4. A check-bleed valve according to claim 3 in which the diameter of said opening in said conical lip is slightly less than the diameter of said passageway.

5. A check-bleed valve according to claim 1 in which said stem has a shoulder and said valve member held on said stem by a washer seated against said shoulder and held by fastening means.

6. A check-bleed valve according to claim 1 in which there is a conical lip at said inlet port extending inwardly therefrom to an opening having a diameter reduced from that of said inlet port to reduce the effect of the velocity of reverse flowing air and improve the pilot pressure during reverse flow.

7. A check-bleed valve comprising, a body having inlet and outlet ports, a pilot piston slidably mounted in said body, a valve seat in said body, a valve member mounted on said pilot piston engageable with said seat to shut off flow between said ports, said pilot piston having a passageway therethrough axially aligned with said ports and terminating in a transverse opening at the inlet port side of said valve member, spring means in said body to bias said pilot piston in one direction, a pressure receiving area on said piston to slide said piston against the bias of said spring means and thereby move said valve off said valve seat when fluid pressure is applied at said inlet port, an opposed pressure receiving area on said body cooperable with said pressure receiving area on said piston and operable after said valve has been moved off said valve seat to urge said valve member toward open position during reverse flow from said outlet to said inlet port.

8. A check-bleed valve according to claim 7 in which said pressure receiving area on said pilot piston includes a flared internal cylindrical surface on said piston opening toward said inlet port.

9. A check-bleed valve according to claim 7 in which pressure receiving area on said body includes a conical lip at said inlet port extending inwardly therefrom to an opening of reduced diameter.

10. A check-bleed valve comprising, a body having inlet and outlet ports, a valve seat in said body, a valve member mounted in said body cooperating with said valve seat and operable to shut off flow between said ports, an actuator slidably mounted in said body to actuate said valve member, spring means in said body to bias said actuator in one direction, a pressure receiving area on said actuator adapted to slide said actuator against the bias of said spring means and thereby move said valve off said valve seat when fluid pressure is applied at said inlet port, and flow directing means in said body for directing the flow of fluid onto said pressure receiving area during reverse flow from said outlet to said inlet port to thereby urge said valve member toward open position during such reverse flow, said flow directing means including a conical lip at said inlet port extending inwardly therefrom to an opening of reduced diameter.

11. A check-bleed valve comprising, a body having inlet and outlet ports, a valve seat in said body, a valve member mounted in said body cooperating with said valve seat and operable to shut off flow between said ports, an actuator slidably mounted in said body to actuate said valve member, spring means in said body to bias said actuator in one direction, a pressure receiving area on said actuator adapted to slide said actuator against the bias of said spring means and thereby move said valve off said valve seat when fluid pressure is applied at said inlet port, and flow restricting means in said body for creating a back pressure in said valve during reverse flow from said outlet to said inlet port to thereby urge said valve member toward open position during such reverse flow, said flow restricting means including a tapered orifice at said inlet port extending inwardly from said inlet port.

References Cited in the file of this patent

UNITED STATES PATENTS

| | | |
|---|---|---|
| 650,650 | Niehoff | May 29, 1900 |
| 1,533,144 | Schurtz | Apr. 14, 1925 |
| 2,797,705 | Frantz | July 2, 1957 |